United States Patent [19]

Haaf et al.

[11] 4,048,260

[45] Sept. 13, 1977

[54] THERMOPLASTIC COMPOSITIONS WITH IMPROVED PROCESSING PROPERTIES

[75] Inventors: Franz Haaf, Bad Durkheim; Guenter Hatzmann, St. Ilgen; Karl Herrle, Ludwigshafen; Petr Simak, Mannheim, all of Germany

[73] Assignee: BASF Aktiengesellschaft, Ludwigshafen, Germany

[21] Appl. No.: 702,974

[22] Filed: July 6, 1976

[30] Foreign Application Priority Data

July 12, 1975 Germany ............................ 2531197

[51] Int. Cl.$^2$ .............................................. C08L 27/06
[52] U.S. Cl. ................................... 260/884; 260/881; 260/898; 260/899
[58] Field of Search .............................. 260/884, 899

[56] References Cited

U.S. PATENT DOCUMENTS

| | | | |
|---|---|---|---|
| 3,375,217 | 3/1968 | Smith et al. | 260/30.4 |
| 3,592,877 | 7/1971 | Mullins | 260/874 |
| 3,760,034 | 9/1973 | Critchfield et al. | 260/874 |
| 3,884,994 | 5/1975 | Critchfield et al. | 260/899 |

*Primary Examiner*—Carman J. Seccuro
*Attorney, Agent, or Firm*—Neil, Thompson & Shurtleff

[57] ABSTRACT

Mixtures based on vinyl chloride polymers and small amounts of copolymer of an ester of acrylic acid or methacrylic acid, which mixtures have been obtained by polymerization of vinyl chloride in the presence of the above copolymer. The said copolymer contains acrylic acid ester or methacrylic acid ester units, units which contain a lactone ring structure, and, optionally, units of other copolymerizable monomers. The mixtures exhibit improved processability and may in particular be used for the manufacture of films, sheets and the like.

9 Claims, No Drawings

THERMOPLASTIC COMPOSITIONS WITH IMPROVED PROCESSING PROPERTIES

The present invention relates to thermoplastic compositions based on vinyl chloride polymers, which contain a copolymer of an acrylic acid ester or methacrylic acid ester, for the purpose of improving the processing properties.

Polyvinyl chloride is a very useful thermoplastic which, because of its good mechanical properties, its resistance to chemicals and weathering, and its high transparency, can be employed for many different purposes. However, in an unplasticized form polyvinyl chloride is very difficult to process and mold, and gives productshaving poor surface characteristics.

The addition of acrylic ester polymers in order to avoid these disadvantages and improve the processability has been disclosed. For calendering polyvinyl chloride, the addition of copolymers of acrylic acid esters and N-vinyllactams, according to German Pat. No. 1,081,659, has proved particularly advantageous. Such additives prevent sticking of the polyvinyl chloride to the calendar bowl and thus permit trouble-free processing and the manufacture of films of improved surface quality, without at the same time excessively affecting the transparency. The addition of copolymers of acrylic acid esters and N-vinyl-lactams however does have an adverse effect on the heat stability of the polyvinyl chloride mixture. Above all, the heat stability of the polyvinyl chloride mixture deteriorates rapidly with increasing proportion of N-vinyl-lactam in the copolymer.

The deterioration of the heat stability can be avoided if an acrylic acid ester polymer which does not contain any N-vinyl-lactam as copolymerized units is added, as a processing assistant, to the polyvinyl chloride. It is true that in most cases the non-stick action of the polymer, during calendering, still persists, but the transparency of the mixture is greatly reduced and hence the material is less suitable for the manufacture of films.

It is an object of the present invention to improve the processabilityof vinyl chloride polymers without significantly impairing the other properties of the polyvinyl chloride, above all its heat stability and its good transparency. The products obtained should in addition have good surface characteristics.

We have found that this object is achieved if vinyl chloride is polymerized in the presence of small amounts of a special acrylate copolymer or methacrylate copolymer, which contains lactone ring structures in copolymerized units.

Accordingly, the present invention relates to thermoplastic compositions based on a vinyl chloride polymer and a copolymer of an acrylic acid ester or a methacrylic acid ester, the compositions being manufactured by polymerization of A. from 99.9 to 80 parts by weight of vinyl chloride or of mixtures of vinyl chloride with up to 30 percent by weight of other monomers copolymerizable with vinyl chloride, in aqueous dispersion, in the presence of B. from 0.1 to 20 parts by weight of a copolymer of an acrylic acid ester or a methacrylic acid ester, in which compositions the copolymer (B) of an acrylic acid ester or methacrylic acid ester contains B1. from 99.9 to 60 percent by weight of copolymerized units of an acrylic acid alkyl ester or methacrylic acid alkyl ester of 2 to 6 carbon atoms in the alcohol component, B2. from 0.1 to 30 percent by weight of units which contain a lactone ring structure and B3. from 0 to 39.9 percent by weight of units of other copolymerizable monomers, the percentages being based on the copolymer.

The thermoplastic compositions according to the invention thus contain a mixture of a vinyl chloride polymer and a copolymer of an acrylic acid ester or methacrylic acid ester, the mixture being obtained by polymerizing the vinyl chloride, or mixture (A) of vinyl chloride with other monomers, in the presence of the acrylic ester copolymer or methacrylic ester copolymer (B).

According to the invention, component B of the thermoplastic compositions is a copolymer made up of recurring units of an acrylicacid ester or methacrylic acid ester (B1) and units (B2) which contain a lactone ring structure. The lactone ring may be in the main chain of the copolymer or may be present as a side group bonded to the main chain. In addition, the copolymer of component B may optionally contain further monomers (B3) as copolymerized units. The copolymer thus consists of from 60 to 99.9 percent by weight, preferably from 70 to 98 percent by weight, of the units (B1) of the acrylic acid alkyl ester or methacrylic acid alkyl ester, from 0.1 to 30 percent by weight, preferably from 2 to 30 percent by weight, of the units (B2) which contain a lactone ring structure, and from 0 to 39.9 percent by weight, preferably from 0 to 28 percent by weight, of other copolymerized monomers (B3). Copolymers which are composed of from 95 to 80 percent by weight of the acrylate units or methacrylate units (B1) and from 5 to 20 percent by weight of the units (B2) containing a lactone ring structure, and in which the proportion of other copolymerizable monomers (B3) in the copolymer may, if present, be up to 10 percent by weight, are particularly advantageous.

The acrylic acid esters and methacrylic acid esters which are present as copolymerized units (B1) in the copolymer (B) to be employed according to the invention, are alkyl esters of acrylic acid or methacrylic acid, of 2 to 6 carbon atoms in the alkyl radical. Examples are ethyl acrylate, propyl acrylate, butyl acrylate and hexyl acrylate and the corresponding methacrylates. Ethyl acrylate, butyl acrylate, ethyl methacrylate and butyl methacrylate are preferred,and of these butyl acrylate and butyl methacrylate are particularly advantageous. Copolymers (B) which contain, as copolymerized units (B1), higher alkyl acrylates or methacrylates of more than six carbon atoms in the alkyl radical result in incompatibility and cloudiness of the mixture with the vinyl chloride polymers. Copolymers (B) which contain methyl acrylate or methyl methacrylate as copolymerized units (B1) are not very effective as processing assistants for calendering, since they only reduce the sticking of the polyvinyl chloride mixture to the calender bowls to an inadequate degree.

As already mentioned, the lactone ring can be contained in various ways in the units (B2), which contain a lactone ring structure, of the copolymer (B). Thus, the lactone ring can either occupy a side position, i.e. it can be bonded, as a side chain, to the main chain of the polymer, or it can form a direct part of the polymer main chain. Usually, the lactone rings present in the copolymer have a five-membered or six-membered structure, i.e. they are generally γ- or δ-lactones.

To manufacture the copolymers (B) which contain the lactone rings in side positions, vinyl-lactones are used as a starting material. The term vinyl-lactones denotes, for the purposes of the invention, lactones which contain side chains with polymerizable olefinic double bonds. Such vinyl-lactones are adequately known and may be manufactured, e.g., by reduction of unsaturated δ-ketocarboxylic acids with sodium borohydride, using the process described in Chemische Berichte 94 (1961), 2,401 - 2,405. Examples of such vinyl-lactones are the alkylene-δ-lactones, i.e. the lactone of 5-hydroxy-8-decenoic acid or the lactone of 5-hydroxy-8-dodecenoic acid. To manufacture the copolymers (B) which are to be used according to the invention, the acrylic acid alkyl ester or methacrylic acid alkyl ester is copolymerized with the vinyl-lactone, in which reaction the vinyl-lactone undergoes polymerization by virtue of the olefinic double bond in the side chain, so that the lactone ring is preserved and, in the polymer, the lactone ring is present as a side group linked to the polymer main chain. Accordingly, in this case the unit (B2), containing a lactone ring structure, of the copolymer (B) is to be understood as a copolymerized unit of the vinyl-lactone.

The copolymerization of the acrylic acid ester or methacrylic acid ester with the vinyl-lactone may be carried out in accordance with conventional polymerization processes, mass polymerization or solution polymerization being preferred. In general, the polymerization is carried out at from 30° to 120° C, in the presence of initiators which form free radicals, e.g. the conventional peroxides or azo compounds. Of course, reaction conditions and additives which are known to cause scission or removal of the lactone ring must be avoided. The copolymerization of the acrylic acid ester or methacrylic acid ester with the vinyl-lactone can also be carried out in the presence of further copolymerizable monomers (B3). Examples of suitable copolymerizable monomers (B3) are other vinyl compounds, e.g. allyl alcohols, vinyl esters, vinyl ethers, styrene, acrylonitrile, vinyl chloride and especially other acrylic acid esters or methacrylic acid esters, e.g. methyl acrylate, methyl methacrylate, benzyl acrylate and the like.

The monomer ratio for the copolymerization is chosen in accordance with the desired composition of the copolymer (B). Preferably, the copolymerization of the acrylic acid ester or methacrylic acid ester (B1) with the vinyl-lactone (B2) and, if appropriate, the other copolymerizable monomers (B3) is carried out in such a way that the resulting copolymer contains from 70 to 98 percent by weight of acrylic acid alkyl ester or methacrylic acid alkyl ester (B1), from 2 to 20 percent by weight of vinyl-lactone (B2) and from 0 to 10 percent by weight of other monomers (B3), as copolymerized units. Particularly preferred copolymers contain from 80 to 95 percent by weight of acrylic acid ester or methacrylic acid ester (B1) and from 5 to 20 percent by weight of vinyl-lactone (B2) as copolymerized units, and no additional monomers (B3).

Copolymers (B) in which the lactone ring is directly contained in the polymer chain are preferred for use in the thermoplastic compositions of the invention. In such copolymers, the units (B2) which contain lactone rings in general have the following structure:

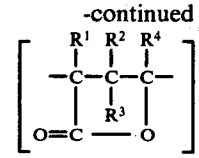

(I)

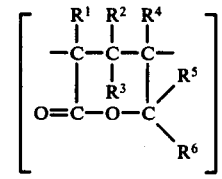

(II)

where the substituents R may be hydrogen or lower alkyl. More particularly, $R^1$ is hydrogen or methyl, but preferably hydrogen, $R^2$ and $R^3$ are hydrogen or substituted or unsubstituted alkyl, and may be identical or different and may together contain up to 6, and preferably up to 4, carbon atoms, it being particularly advantageous if $R^2$ and $R^3$ are hydrogen or substituted or unsubstituted methyl or ethyl, and more especially advantageous if at least $R^2$, but preferably $R^2$ and $R^3$, is hydrogen, $R^4$ is hydrogen or methyl, but preferably hydrogen, and $R^5$ and $R^6$ are hydrogen or alkyl of 1 to 4 carbon atoms, and may be identical or different, and can also be linked to one another to form a cycloaliphatic ring of 5 to 7 carbon atoms, but preferably are hydrogen or methyl or ethyl, in which case advantageously only $R^5$ is hydrogen.

The copolymers (B) which contain the lactone ring directly in the polymer chain may be manufactured in various ways. One possible method is to copolymerize unsaturated lactones, especially δ-lactones, which contain a polymerizable olefinic double bond in the lactone ring, with the acrylic acid alkyl ester or methacrylic acid alkyl ester (B1) and, optionally, further monomers (B3); this copolymerization can be carried out under conventional and known conditions. However, as a rule these copolymers (B) are manufactured advantageously by copolymerizing the acrylic acid alkyl ester or methacrylic acid alkyl ester (B1) with an unsaturated alcohol or a monomer which forms such an alcohol and lactonizing the resulting copolymer during and/or after the polymerization.

For this purpose, the acrylic acid alkyl ester methacrylic acid akyl ester (B1) is preferably polymerized in the presence of an α,β-olefinically unsaturated alcohol of the general formula

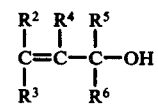

where the substituents $R^2$ to $R^6$ have the meanings given above. Examples of such alcohols are allyl alcohol, butenols, such as but-1-en-3-ol, but-2-en-1-ol , but-2-ene-1,4-diol, 3-methylbut-2-en-1-ol and 3-methylbut-1-en-3-ol, pentenols, e.g. pent-1-en-3-ol, 3-methylpent-1-en-3-ol and 3-methylpent-2-ene-1,5-diol, and 1-vinyl-1-hydroxycyclohexane. The use of α,β-olefinically unsaturated alcohols where $R^4$ is hydrogen is preferred, and in that case the copolymerization is preferably carried out with an acrylic acid ester rather than a methacrylic acid ester. Allyl alcohol and but-1-en-3-ol have proved particularly advantageous. However, to manufacture the copolymer (B) to be employed according to the invention, the acrylic acid alkyl ester or methacrylic acid alkyl ester (B1) can also be copolymerized with a monomer which is able to form an alcohol group, i.e. with monomers which, under the lactonizing conditions, form hydroxyl groups, which can then undergo lactonization with the ester groups of the acrylic acid ester or methacrylic acid ester units. Such monomers capable of forming alcohol groups are, in particular, vinyl ester, e.g. vinyl acetate or vinyl propionate, and allyl esters, e.g. allyl acetate.

The copolymerization of the acrylic acid alkyl ester or methacrylic acid alkyl ester (B1) with the $\alpha,\beta$-olefinically unsaturated alcohol, or the monomer which forms an alcohol group, may be carried out in accordance with conventional processes, by mass polymerization, solution polymerization, suspension polymerization or emulsion polymerization of the monomers in the presence of initiators which form free radicals, e.g. the conventional peroxides or azo compounds, advantageously at from 30° to 150° C, as described, e.g., in German Pat. No. 870,034. Bulk polymerization or solution polymerization are preferred, and for the latter the conventional solvents, e.g aromatic hydrocarbons, ethers, esters and ketones may be used. To obtain copolymers particularly rich in alcohol groups it is advantageous to take the unsaturated alcohol or the monomer which forms an alcohol group and to run the acrylic acid alkyl ester or methacrylic acid alkyl ester in slowly in step with the progress of the polymerization. The copolymerization can in that case also be carried out in the presence of other copolymerizable monomers, suitable monomers being, in particular, other acrylic acid esters or methacrylic acid esters, e.g. methyl acrylate and methyl methacrylate, but also, e.g., styrene, acrylonitrile and vinyl chloride.

The copolymers resulting from the polymerization of the acrylic acid ester or methacrylic acid ester with the $\alpha,\beta$-olefinically unsaturated alcohol or the monomer which forms an alcohol group, and, optionally, the further monomers, are then lactonized entirely or partially, by conventional methods, so as to arrive at a copolymer, containing a lactone ring structure in copolymerized units, which is employed as component B according to the invention. Suitable processes for lactonizing these copolymers are described, e.g. in German Laid-Open Application 2,126,357 and U.S. Pat. No. 3,515,706. According to these publications, lactonizing can be effected by heating the copolymer, in the presence or absence of relatively high-boiling inert organic solvents, at not less than 100° C, preferably at from 150° to 250° C, and removing the volatile compounds produced, if appropriate under reduced pressure. The lactonizing can be accelerated substantially by adding small amounts of conventional esterification catalysts, e.g. inorganic or organic acids, such as hydrochloric acid, phosphoric acid or toluene sulfonic acid, or other esterification catalysts, e.g. sodium methylate, which in general are added in amounts of from 0.01 to 0.1 percent by weight, based on the copolymer. If mass polymerization or solution polymerization is used, the lactonizing may be carried out directly after the polymerization. However, depending on the chosen polymerization conditions, lactonizing may at least partially already occur during polymerization and can in that case, if necessary, be continued, to the desired degree, after the polymerization. The degree of lactonizing may be controlled by conventional methods, e.g. by choice of the temperature at which the treatment is carried out, or of its duration.

The copolymers (B) manufactured in this way contain the lactone ring directly in the polymer chain and consist of units (B1) of copolymerized acrylic acid alkyl ester or methacrylic acid alkyl ester, of lactone ring units (B2) of the general structure (I) and/or (II) given above, and, optionally, of units (B3) of other copolymerized monomers. The units (B3) may be either the copolymerized $\alpha,\beta$-olefinically unsaturated alcohols, or copolymerized monomers which form alcohol groups, which have not undergone lactonization, or may be units of other monomers which have optionally been used as additional constituents during the polymerization. The composition of these copolymers (B) with the lactone ring in the polymer chain is thus determined both by the composition of the original monomer mixture and by the degree of lactonizing. Preferably, these copolymers contain from 70 to 98 percent by weight of the acrylate or methacrylate units (B1), from 2 to 30 percent by weight of the lactone ring units (B2), and up to 28 percent by weight, and preferably up to 10 percent by weight, of the units (B3) of the other monomers. The use of copolymers comprising from 80 to 95 percent by weight of units (B1), from 5 to 20 percent by weight of units (B2) and optionally up to 10 percent by weight of units (B3) is particularly advantageous.

To manufacture the thermoplastic compositions of the invention, vinyl chloride is now polymerized in aqueous dispersion in the presence of acrylic acid ester or methacrylic acid ester copolymers containing lactone ring structures in copolymerized units (component B). Preferably, copolymers having a mean weight average molecular weight, determined by viscosity measurements, of from 10,000 to 50,000 are employed as component B. However, copolymers (B) having a higher molecular weight, e.g. up to 100,000 or even above, can also be employed. Instead of pure vinyl chloride, mixtures of vinyl chloride with up to 30 percent by weight, preferably up to 15 percent by weight, of other monomers, which are copolymerizable with vinyl chloride, can also be employed in the polymerization. Examples of monomers copolymerizable with vinyl chloride are vinylidene chloride, vinyl esters, preferably vinyl acetate and vinyl propionate, acrylic acid alkyl esters and methacrylic acid alkyl esters, acrylonitrile, styrene and especially olefins, preferably ethylene and propylene. However, it is preferred to polymerize vinyl chloride by itself.

The polymerization of the vinyl chloride or of the mixtures of vinyl chloride with other copolymerizable monomers (A) in the presence of acrylic acid ester or methacrylic acid ester copolymers (B) containing lactone ring structures in copolymerized units, is carried out in aqueous suspension or aqueous emulsion, by conventional methods, using initiators which form free radicals, in general at from 30 to 75° C. In the case of the preferred polymerization in aqueous suspension, it is advantageous to use monomer-soluble initiators, in particular in an amount of from about 0.01 to 1 percent by weight, based on the monomers employed. Particularly suitable initiators for this purpose are azo compounds, e.g. azodiisobutyronitrile and azodicarbonamide, or organic peroxides, per-esters and per-carbonates, such as lauroyl peroxide, benzoyl peroxide, di-tert.-butyl perpivalate, isopropyl percarbonate or acetylsulfonylcyclohexane peroxide, individually or in combination with one another. In the case of polymerization in aqueous emulsion, water-soluble initiators, e.g. inorganic peroxides, percarbonates, persulfates, perborates or redox catalysts are used. Depending on the medium in which the polymerization is carried out, the conventional additives and polymerization assistants may be used. In the case of polymerization in aqueous suspension, water-soluble protective colloids are added in a total concentration of from 0.01 to 1 percent by weight, and, if appropriate, surfactants are also added. Examples of protective colloids are methylcellulose, hydroxypropylcellulose, gelatine, partially hydrolyzed polyvinyl acetate, polyvinyl alcohol, polyvinylpyrrolidone and their combinations, but barium sulfate may also be used. In the case of polymerization in aqueous emulsion, emulsifiers used are alkylsulfonates, aralkylsulfonates, alkyl-sulfates or aralkyl-sulfates or the salts of fatty acids, in concentrations of from 0.1 to 5 percent by weight. In the case of suspension polymerization, the weight ratio of water to monomer is preferably from 5:1 to 1:3, and especially from 3:1 to 1:2, the choice of the phase ratio depending on the physical properties of the polymer which is to be manufactured. In the case of emulsion polymerization, water:monomer ratios of from 3:1 to 1:1 are advantageous.

The vinyl chloride polymerization is carried out by polymerizing from 99.9 to 80 parts by weight, preferably from 99.5 to 95 parts by weight, of the vinyl chloride, or of the mixture of vinyl chloride with other copolymerizable monomers (A), in the presence of from 0.1 to 20 parts by weight, preferably from 0.5 to 5 parts by weight, of the acrylic acid ester or methacrylic acid ester copolymer (B). The polymer mixture obtained is isolated from the reaction mixture, and worked up, by conventional methods, e.g. by precipitation, drying or spray-drying. The product contains the polymer components as a completely homogeneous mixture; the conventional additives, e.g. stabilizers, fillers, pigments, dyes and the like may furthermore be added.

The thermoplastic compositions of the invention may be processed by conventional thermoplastic processing methods, e.g. extrusion and calendering, and may be used for the manufacture of sheets, films and the like. The compositions of the invention exhibit good processability and show no tendency to stick to the calender bowls during calendering. Moldings manufactured from the thermoplastic compositions have good surface characteristics; films are of good quality and good transparency. A deterioration of the heat stability of the vinyl chloride polymers, such as is found when polyvinyl chloride is mixed with an acrylate/vinyl-lactam copolymer, is not observed in the case of the thermoplastic compositions of the invention. The other advantageous characteristics of polyvinyl chloride are also preserved.

In the Examples, parts and percentages are by weight.

EXAMPLES 1 to 15

100 parts of butyl acrylate are polymerized in the presence of 10 parts of the α,β-olefinically unsaturated alcohols shown in Table 1, using 0.3 part of azodiisobutyronitrile and 0.4 part of di-tert.-butyl peroxide, for 5 hours at about 110° C. After distilling off the volatile constituents, a copolymer is obtained which contains about 60 percent of the copolymerized unsaturated alcohol in a lactonized form.

100 parts of vinyl chloride are polymerized at 50° C, in a pressure kettle provided with a stirrer, in the presence of 400 parts of water, 0.2 part of azodiisobutyronitrile, 0.2 part of gelatine and 5 parts of the butyl acrylate copolymer obtained above. The polymer obtained, which consists of fine granules, can be processed on a calender to give a clear, glossy film. To determine the heat stability, a part of the mill hide is stored in an oven at 180° C. To determine the transparency, the mixture is pressed to give 4 mm thick sheets, and the light transmission at 450 nm is measured. The effect on the calendering characterictics was assessed from the tendency of the mixture to stick to the calendar bowls, minimum sticking being desirable. The results are summarized in Table 1

COMPARATIVE EXAMPLES A AND B

The polymerization of vinyl chloride was carried out as described in Examples 1 to 5, but instead of the butyl acrylate copolymer with lactone ring structures in copolymerized units, a pure butyl acrylate homopolymer was employed in Comparative Example A, and an acrylic ester/N-vinyl-lactam copolymer according to German Pat. No. 1,081,659, which had been manufactured by polymerizing a mixture of 100 parts of butyl acrylate and 10 parts of N-vinylpyrrolidone, in Comparative Example B. The properties of these mixtures are also shown in Table 1.

TABLE 1

| Example or Comparative Example | Compound added when polymerizing the butyl acrylate (ratio 10 : 1) | Light transmission (%) at 450 nm | Stability on storage at 180° C (mins) | Non-tackiness on calendering |
| --- | --- | --- | --- | --- |
| 1 | But-1-en-3-ol | 72 | 110–125 | + |
| 2 | Allyl alcohol | 79 |  | + |
| 3 | But-2-ene-1,4-diol | 38 |  | + |
| 4 | 3-Methylbut-2-en-1-ol | 36 |  | + |
| 5 | 3-Methylpent-2-ene-1,5-diol | 37 |  | + |
| A | — | 16 |  | + |
| B | N-Vinylpyrrolidone | 78 | 65 | + |

EXAMPLES 6 to 13

Example 1 is repeated, but in the manufacture of the copolymer, instead of using 100 parts of butyl acrylate, 100 parts of the monomers or monomer mixtures indicated in Table 2 are polymerized in the presence of 10 parts of but-1-en-3-ol. The properties of the corresponding polyvinyl chloride mixtures are shown in Table 2.

COMPARATIVE EXAMPLES C TO F

Example 1 is repeated, but in the manufacture of the copolymer, instead of using 100 parts of butyl acrylate, 100 parts of the monomers or monomer mixtures indicated in Table 2 are polymerized in the presence of 10 parts of but-1-en-3-ol, so that the resulting products are not the copolymers to be employed according to the invention. The properties of the corresponding polyvinyl chloride mixtures are also shown in Table 2.

TABLE 2

| Example/Comparative Example | Monomers employed in the manufacture of the copolymer (B) (in parts) per 10 parts of but-1-en-3-ol | Light transmission (%) at 450 nm | Non-tackiness on calendering |
|---|---|---|---|
| 6 | 95 BA/ 5 MMA | 78 | + |
| 7 | 90 BA/10 MMA | 79 | + |
| 8 | 70 BA/30 MMA | 79 | + |
| C | 50 BA/50 MMA | 78 | − |
| D | 10 BA/90 MMA | 80 | − |
| 9 | 90 BA/10 St | 61 | + |
| 10 | 90 BA/10 AN | 62 | + |
| 11 | 90 BA/10 benzyl acrylate | 71 | + |
| 12 | 90 BA/10 glycidyl acrylate | 72 | + |
| 13 | 100 ethyl acrylate | 86 | + |
| E | 100 methyl acrylate | 55 | − |
| F | 100 2-ethylhexyl acrylate | 21 | + |

BA : butyl acrylate
MMA : methyl methacrylate
St : styrene
AN : acrylonitrile

The sheets and films manufactured according to Comparative Example F exhibit not only inadequate transparency but also poor surface characteristics.

We claim:

1. A thermoplastic composition containing a mixture of a vinyl chloride polymer and an acrylic ester copolymer or methacrylic ester copolymer, which mixture has been manufactured by polymerization of
    A. from 99.9 to 80 parts by weight of vinyl chloride or of a mixture of vinyl chloride with up to 30 percent by weight of one or more other monomers copolymerizable with vinyl chloride, in aqueous dispersion, in the presence of
    B. from 0.1 to 20 parts by weight of a copolymer of an acrylic acid ester or a methacrylic acid ester which contains
        B1. From 99.9 to 60 percent by weight of copolymerized units of an acrylic acid alkyl ester or methacrylic acid alkyl ester of 2 to 6 carbon atoms in the alcohol component,
        B2. from 0.1 to 30 percent by weight of units which contain a lactone ring structure and
        B3. from 0 to 39.9 percent by weight of units of one or more other copolymerizable monomers, the percentages being based on the above copolymer B.

2. A thermoplastic composition as claimed in claim 1, wherein the acrylic acid ester or methacrylic acid ester copolymer (B) contains
    B1 from 98 to 70 percent by weight of copolymerized units of an acrylic acid alkyl ester or methacrylic acid alkyl ester of 2 to 6 carbon atoms in the alcohol component,
    B2 from 2 to 30 percent by weight of units which contain a lactone ring structure and
    B3 from 0 to 28 percent by weight of units of one or more other copolymerizable monomers, the percentages being based on the copolymer.

3. A thermoplastic composition as claimed in claim 1, wherein the lactone ring in the units (B2) of the acrylic acid ester of methacrylic acid ester copolymer (B) is bonded as a side group to the main chain of the copolymer (B).

4. A thermoplastic composition as claimed in claim 3, wherein the acrylic acid ester or methacrylic acid ester copolymer (B) contains
    B1 from 90 to 70 percent by weight of copolymerized units of an acrylic acid alkyl ester or methacrylic acid alkyl ester of 2 to 6 carbon atoms in the alcohol component,
    B2 from 2 to 20 percent by weight of units which contain a lactone ring structure and
    B3 from 0 to 10 percent by weight of units of one or more other copolymerizable monomers, the percentages being based on the copolymer.

5. A thermoplastic composition as claimed in claim 4, wherein the acrylic acid ester or methacrylic acid ester copolymer (B) contains
    B1 from 95 to 80 percent by weight of copolymerized units of an acrylic acid alkyl ester or methacrylic acid alkyl ester of 2 to 6 carbon atoms in the alcohol component and
    B2 from 5 to 20 percent by weight of units which contain a lactone ring structure, the percentages being based on the copolymer.

6. A thermoplastic composition as claimed in claim 1, wherein the acrylic acid ester or methacrylic acid ester copolymer (B) contains the lactone ring in the polymer main chain.

7. A thermoplastic composition as claimed in claim 6, wherein the acrylic acid ester or methacrylic acid ester copolymer (B) contains
    B from 95 to 80 percent by weight of copolymerized units of an acrylic acid alkyl ester or methacrylic acid alkyl ester of 2 to 6 carbon atoms in the alcohol component,
    B2 from 5 to 20 percent by weight of units which contain a lactone ring structure and
    B3 from 0 to 10 percent by weight of units of other copolymerizable monomers, the percentages being based on the copolymer.

8. A thermoplastic composition as claimed in claim 1, wherein the acrylic acid ester or methacrylic acid ester copolymer (B) contains copolymerized acrylic acid butyl ester of methacrylic butyl ester units as the acrylic acid alkyl ester or methacrylic acid alkyl ester units (B1).

9. A thermoplastic composition as claimed in claim 1, which comprises a mixture of from 99.5 to 95 parts of the vinyl chloride polymer (A) and from 0.5 to 5 parts of the acrylic acid ester or methacrylic acid ester copolymer (B).

* * * * *